United States Patent [19]
Vandevelde

[11] Patent Number: 5,970,909
[45] Date of Patent: Oct. 26, 1999

[54] FEEDING FENCES

[76] Inventor: Noël Vandevelde, Route de Mettet 201, 5620 Florennes, Belgium

[21] Appl. No.: 09/112,121
[22] Filed: Jul. 8, 1998
[30] Foreign Application Priority Data Jul. 9, 1997 [BE] Belgium ................................ 09700593

[51] Int. Cl.$^6$ ..................................................... A01K 1/06
[52] U.S. Cl. .................................................................. 119/5
[58] Field of Search .................................... 119/735, 737, 119/739, 740, 741, 742, 743, 744, 745

[56] References Cited

U.S. PATENT DOCUMENTS 4,377,131  3/1983  Vandenberg et al. ................... 119/741
4,976,224  12/1990  Hatfield .................................... 119/741
5,694,887  12/1997  Vandenberg ............................ 119/741

Primary Examiner—Thomas Price
Attorney, Agent, or Firm—Steinberg & Raskin, P.C.

[57] ABSTRACT

Feeding fence including a portico including upper and lower beams and posts which define juxtaposed openings, the plane of each opening including a swivel device suspended to a support, wherein each swivel device is formed by two elements hingedly mounted about an axis, the lower element being connected at its lower end to a control rod mounted in a way to extend along the lower beam and the upper end of the upper element being provided with a locking member sliding along a control rod extending in a parallel relationship to the upper beam.

10 Claims, 2 Drawing Sheets

FEEDING FENCES

FIELD OF THE INVENTION

The present invention relates to arrangements established before a trough and intended to limit the movements of animals which are eating.

BACKGROUND OF THE INVENTION

Such feeding fence arrangements, called cornadis, are currently used. Particularly a feeding fence is known in which the catching of the animal is realized by lowering the head in a frame formed on the one hand by a portico column and, on the other hand, by a swivel member mounted on a pivot pin and guided by the upper beam of the portico. The upper fork of the swivel member comprises a locking element which comes in contact with a fixed stop on a tube provided on the upper beam and which allows, by a pivotal movement of 90°, the locking position and the releasing position. This arrangement has the drawback that it does not impede the strangling of the animals.

SUMMARY OF THE INVENTION

This inconvenience is avoided in the case of the invention by a feeding fence wherein each opening includes a swivel device formed by two elements hingedly mounted on an axis in order to make the upper element independent from the lower one. The lower element is connected at its lower end to a control rod mounted in a way to slide along the lower beam. The upper end of the upper element is provided with a shutter or locking element sliding along the control rod which extends in parallel relationship to the upper beam.

On the support on which is hinged the swivel device is provided a stop or abutment which inhibits any movement of the mechanism when the lower element is in its inclined position.

The feeding fence according to the invention allows a second releasing on the lower beam of the feeding fence. This releasing insures a perfect security for the animals when the mechanism is in its free service and opened position. Furthermore, this feeding fence proves to be more silent.

BRIEF DESCRIPTION OF THE DRAWINGS

The invention is disclosed herebelow by means of annexed drawings.

DETAILED DESCRIPTION OF THE PREFERRED EMBODIMENTS

Figure 1:
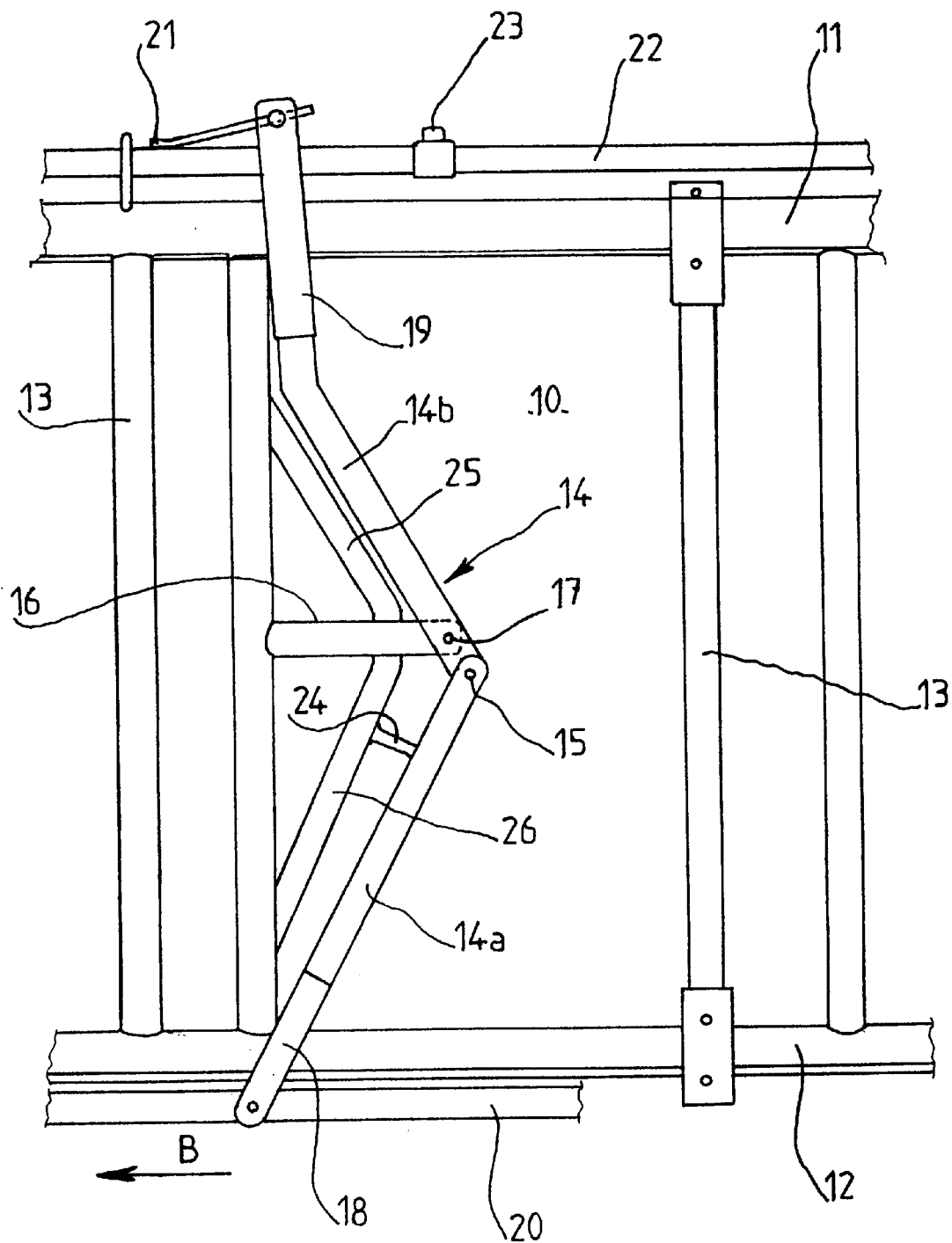
FIG. 1 is a partial view of a feeding fence according to the invention, in its opened position.

The arrangement shown partially on the drawings comprises in a current manner an upper beam 11, a lower beam 12 and vertical posts 13 defining openings 10 for allowing the animals to pass the head. In each opening 10 is provided a swivel device 14 formed by two elements 14a and 14b mounted hingedly on an axis 15. The swivel device 14 is suspended on a support 16 by means of a pivot pin 17, located at a certain distance from the axis 15, above this axis. The support 16 is implemented in the shape of a substantially horizontal bar and fixedly secured at its end opposite to the pivot axis 17 to the post 13 which defines the opening on the swivel device side, substantially in the middle of the opening. Between the post 13 and the support bar 16 are mounted fixedly on both sides thereof inclined bars respectively 25 and 26. The lower inclined bar 26 carries a stop 24 which limits the pivoting movement of the element 14a about the axis 15.

The lower end of the swivel element 14a of the swivel device 14 is provided with a fork 18 connected to a control rod 20 extending along the lower beam 12.

The upper end of the swivel element 14b is provided with a fork 19 adapted to slide along the upper beam 11. On the fork 19 is secured a locking member 21 resting on a control rod 22 which extends along the upper beam 11. The control rod 22 is mounted in a way to be able to rotate about its longitudinal axis and carries a stop 23. The locking member and the stop are shaped in a way that the locking member can pass above the stop when the fork moves in a direction from the left to the right side, but is locked behind the stop after having passed the latter. For releasing the fork it is necessary to cause the control rod to rotate about its longitudinal axis in view to have the stop out of the locking member path, for instance about an angle of 90°.

Each swivel device 14 is capable of being in a multitude of positions:

1) A swivelled position of the element 14b and an inclined position of the element 14a (FIG. 1): the feeding fence is in its opened free service and security position; as long as the element 14a is held in this position the element 14b is also locked in its inclined shown opened position since any pivoting movement would require a movement of the axis 15 towards the left side, which is however impeded by the abutment or stop 24;

2) Swivelled position of the element 14b and substantially vertical position of the element 14a (FIG. 2, broken lines); the feeding fence is in its closed position wherein the head of the animal is locked. In this position any movement of pressing the head against the hinge zone of the elements 14a, 14b would cause a pivoting movement of the element 14b about the axis 15 and the movement of the locking member 21 towards the right side until it becomes locked behing the stop 21.

3) Vertical position of both elements 14a and 14b (FIG. 2, full line): the locking member 21 is in contact with the stop 23 and the feeding fence is in its closed position.

The control rod 22 serves to disengage the locking member 21 from the stop 23 and enables the swingable device to be cut again in its opened position. The opening movement is made easy by the lower rod 20 and the abutment 24 which allows simultaneously the locking of the whole mechanism.

The feeding fence being in its closed position, it is sufficient to cause the control rod 22 to rotate about its longitudinal axis for releasing the locking member 21 from the stop 23. This allows the upper element 14b to swingable about the axis 15 and enables the animal to get out its head.

In view to put the feeding fence in the security position, it is sufficient to pull on the rod 20 in the direction of the arrow B (FIG. 1), for putting the lower element 14a in its inclined position.

Figure 2:
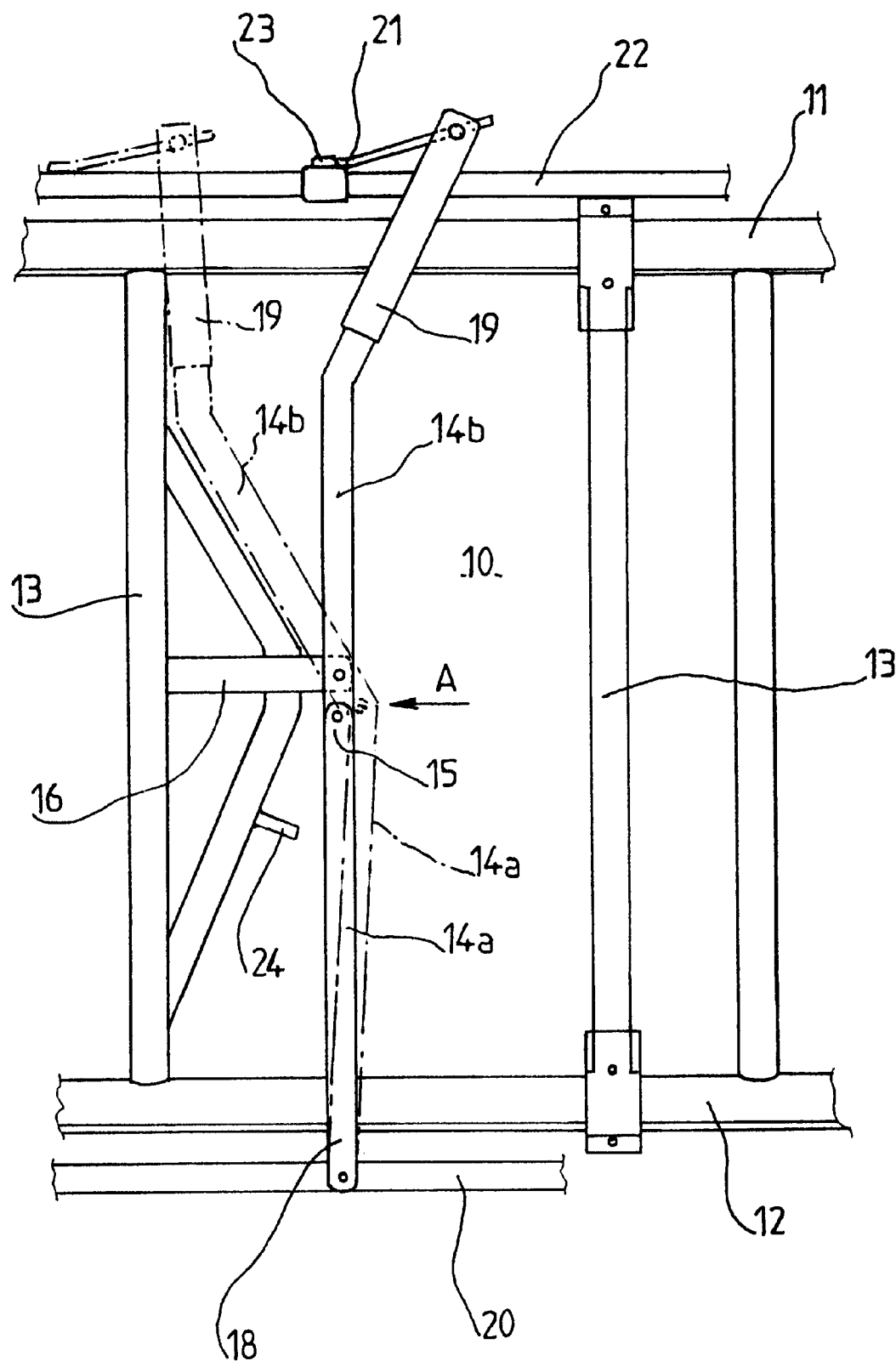
FIG. 2 is a figure similar to the FIG. 1 with the feeding fence in its closed position.

By a light pressure indicated by the arrow A, the animal can push back the lower element 14a enabling the lower element 14b to get in its vertical closing position (FIG. 2).

Since in its opened free service position the swivel device 14 is locked by the rod 20 and the abutment 24, the feeding fence proposed by the invention constitutes an efficient solution to the problems of the noise and any rapid wear inherent to the known feeding fences.

I claim:

1. Feeding fence comprising a portico including upper and lower beams and posts which define juxtaposed openings, a support arranged in each of said openings, a first control rod extending along said lower beam, a second control rod extending along and parallel to said upper beam, a swivel device arranged in each of said openings and mounted on said support in said opening, each of said swivel devices being formed by lower and upper elements hingedly mounted about an axis, said lower element having a lower end connected to said first control rod and said upper element having an upper end, and a locking member arranged at said upper end of said upper element and sliding along said second control rod.

2. Feeding fence according to claim 1, wherein said second control rod carries a stop retractable between a position in which said locking member is locked and a position in which said locking member is released.

3. Feeding fence according to claim 1, further comprising an abutment for locking the fence when said lower element is in an inclined position.

4. Feeding fence according to claim 1, wherein each of said swivel devices is rotatably mounted on the respective one of said supports.

5. Feeding fence according to claim 1, wherein said upper element of each of said swivel devices is hingedly mounted to the respective one of said supports.

6. Feeding fence according to claim 1, wherein said support is a horizontal bar.

7. Feeding fence according to claim 1, wherein said lower end of said lower element includes a fork which is connected to said first control rod.

8. Feeding fence according to claim 1, wherein said upper end of said upper element includes a fork adapted to slide along said upper beam.

9. Feeding fence according to claim 8, wherein said fork is secured to said locking member.

10. Feeding fence according to claim 1, wherein said second control rod has a longitudinal axis and is rotatable about said longitudinal axis.

* * * * *